United States Patent [19]
Amrany et al.

[11] Patent Number: 5,278,865
[45] Date of Patent: Jan. 11, 1994

[54] TIMING RECOVERY SCHEME FOR A TRANSCEIVER USING A SINGLE SAMPLE CLOCK SOURCE FOR TRANSMITTING AND RECEIVING SIGNALS

[75] Inventors: Daniel Amrany, Wayside; Michael D. Rauchwerk, Homldel, both of N.J.

[73] Assignee: AT&T Bell Laboratories, Murray Hill, N.J.

[21] Appl. No.: 880,813

[22] Filed: May 8, 1992

[51] Int. Cl.$^5$ .......................... H04B 1/38; H04L 5/16; H04L 7/04

[52] U.S. Cl. .......................................... 375/8; 375/7; 375/111

[58] Field of Search .......................... 375/7, 8, 111, 118, 375/119, 9, 12, 14, 15, 106, 108; 370/32

[56] References Cited

U.S. PATENT DOCUMENTS

4,856,030 8/1989 Batzer et al. .............................. 375/8

Primary Examiner—Curtis Kuntz
Assistant Examiner—Duane Kobayashi
Attorney, Agent, or Firm—David R. Padnes

[57] ABSTRACT

The present invention addresses a timing synchronization problem which arises in tandem modem operation when a single codec strobed by a common sample clock is used for A/D and D/A signal conversion in a modem. Tandem modem operation is defined as a system application when two modems have their RS-232 interfaces directly connected to one another. In accordance with the present invention, a digital interpolator connected to the A/D converter in the modem effectively alters the timing phase of the A/D converter in response to first and second control signals. The first control signal is generated in response to an externally supplied clock and an internal modem clock and is representative of any perturbations in the externally supplied clock with respect to the internal modem clock. The second control signal is generated in response to digital signals derived from the incoming analog signal from a remote modem and is representative of any residual asynchronism between the transmit sample clock of the remote modem and the modem's transmit sample clock after alteration by the digital interpolator in response to the first control signal alone.

11 Claims, 7 Drawing Sheets

TIMING RECOVERY SCHEME FOR A TRANSCEIVER USING A SINGLE SAMPLE CLOCK SOURCE FOR TRANSMITTING AND RECEIVING SIGNALS

TECHNICAL FIELD

The present invention relates to communications systems and, more particularly, to such systems wherein a single sample clock source is utilized in a transceiver.

BACKGROUND OF THE INVENTION

Figure 1:
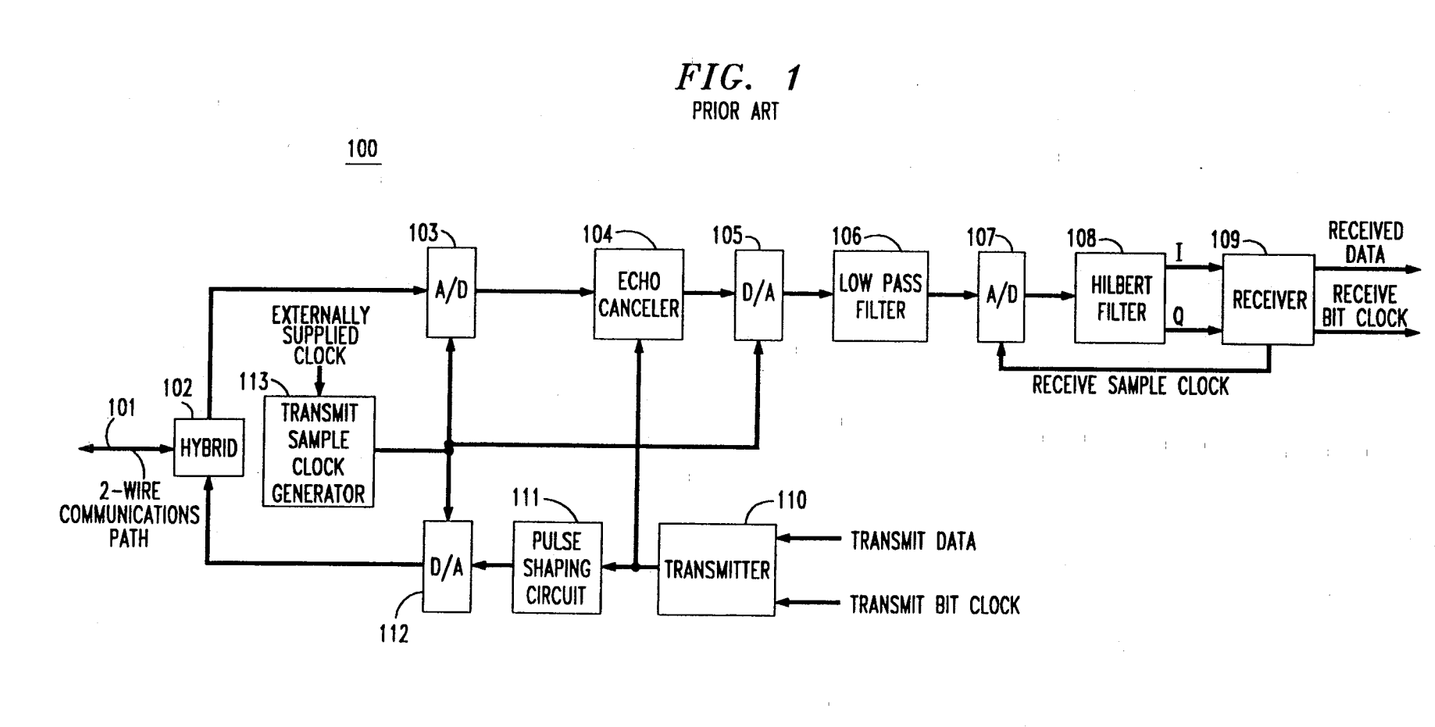
FIG. 1 is a block-schematic diagram of a prior art portion of a conventional modem.

For synchronous communications applications, many modems utilize a digital signal processor coupled with an analog "front end" to implement the signal processing. One illustrative front end 100 is shown in FIG. 1. As shown, in the receive portion of this front end, the incoming quadrature amplitude modulated (QAM) line signal from 2-wire communications path 101 is coupled through hybrid 102 and sampled by analog-to-digital (A/D) converter 103. Echo canceller 104 subtracts the synthesized echo from the digital samples provided by converter 103 using the transmit symbols provided by transmitter 110. The echo-free samples are then converted back to an analog signal by digital-to-analog converter (D/A) 105, passed through low-pass filter 106 and supplied to A/D converter 107. Converter 107 provides digital samples to Hilbert filter 108 which outputs the real and imaginary passband components of each supplied sample. These real and imaginary components, respectively designated as I and Q, are coupled to conventional receiver 109 which outputs the received data and the received bit clock that is synchronized to a remote transmitter clock. In the transmit direction, transmitter 110 accepts the incoming data and the transmit bit clock and provides the transmit symbols to pulse shaping circuit 111. The pulse shaped output of circuit 111 is then converted into an analog signal by D/A converter 112. For proper operation of echo canceller 104, A/D converter 103, D/A converter 105 and D/A converter 112 are strobed by the transmit sample clock while A/D converter 107 is strobed by the receive sample clock. Each of these converters is disposed between a pair of low-pass filters (not shown). Transmit sample clock generator 113 generates the transmit sample clock which is frequency locked to an externally supplied clock signal. This externally supplied clock signal is normally the transmit bit clock used by transmitter 110. The transmit and receive sample clocks are those clock signals used to strobe the A/D and D/A converters and such clocks normally have a higher frequency than the symbol rate. The challenge in implementing front end 100 is to provide precision converters on a single integrated circuit with asynchronous transmit and receive clocks.

Figure 2:
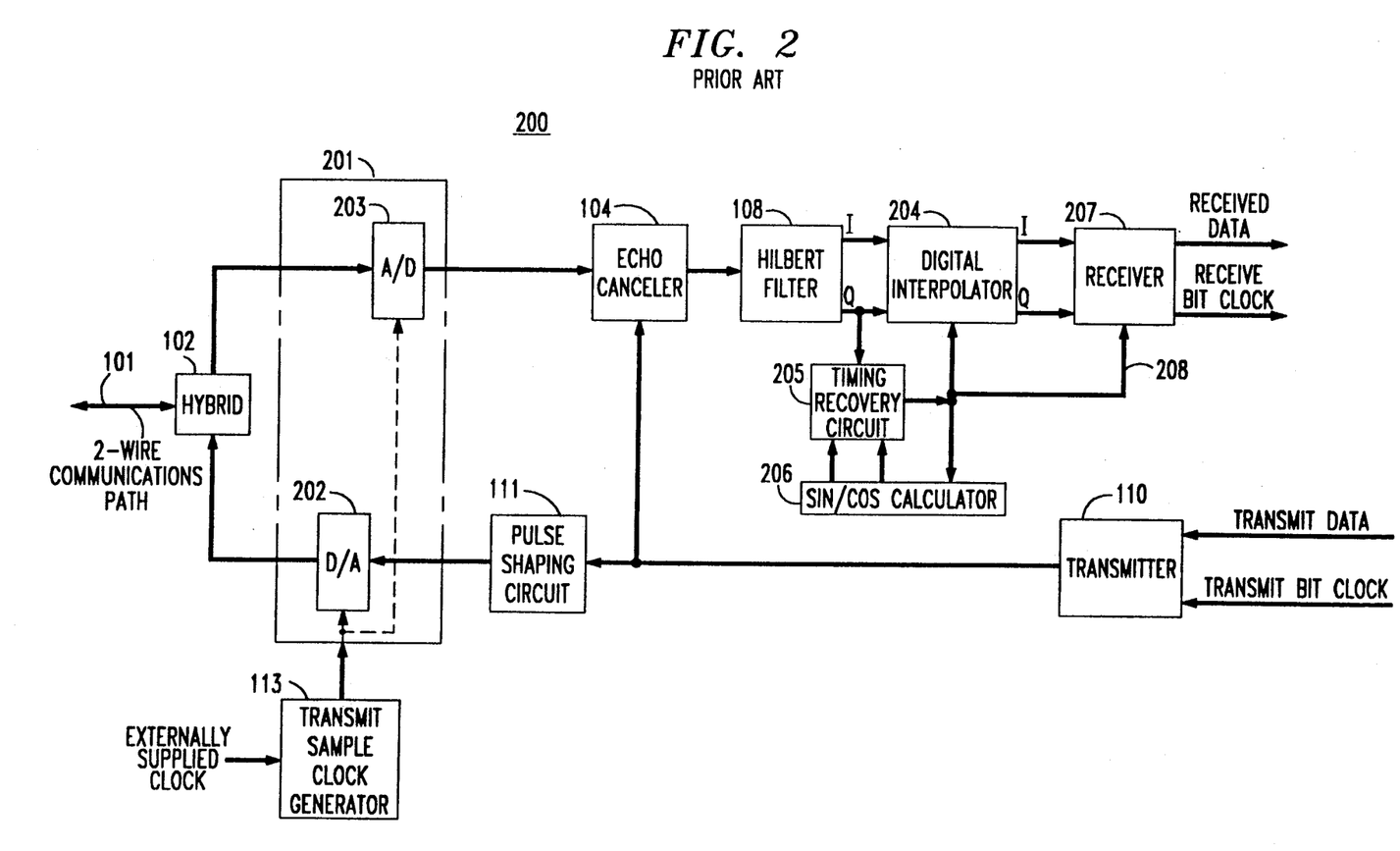
FIG. 2 is a block-schematic diagram of a more recently developed prior art equivalent to the conventional modem portion shown in FIG. 1.

To reduce costs, more recently developed modems utilize the illustrative front end 200 shown in FIG. 2. Front end 200 utilizes some of the elements described in FIG. 1 and such elements provide the same function and are designated by the same reference numerals in FIG. 2. In addition, front end 200 also includes a codec 201. As shown, a codec 201 incorporates precision A/D and D/A converters, respectively designated as 202 and 203. As in FIG. 1 and in the drawing figures to be discussed, each of these converters is disposed between a pair of low-pass filters (not shown). In modems incorporating an echo canceller 104, the codec must be strobed by a common sample clock defined as the transmit sample clock. Moreover, in modems not incorporating an echo canceller, it is often advantageous to utilize a common sample clock to increase performance. For illustrative purposes, it is assumed that this sample clock has a nominal frequency of 7200 Hz. It should, of course, be understood that the present invention is not limited to a particular sample clock frequency and may be used with any sample clock frequency. D/A converter 202 is utilized within the transmitter portion of the modem to form samples of the signal to be transmitted through 2-wire communications path 101 to a remote location. Similarly, A/D portion 203 is utilized within the receiver portion of the modem to form samples of the signals received from the remote location via path 101.

To compensate for the fact that A/D converter 203 is not synchronized to the transmitter clock at the remote location, the output of this A/D converter is coupled to digital interpolator 204 after passing through echo canceller 104 and Hilbert filter 108. The circuitry within interpolator 204 is well-known. One illustrative interpolator is disclosed in U.S. Pat. No. 4,866,647 to C. W. Farrow, "Continuously Variable Digital Delay Circuit," issued Sep. 12, 1989, and in an ISCAS 1988 conference paper to C. W. Farrow entitled, "Continuously Variable Digital Delay Element." Both of these documents are hereby incorporated by reference. The digital interpolator alters the sample values it receives in response to a control signal on lead 208. Timing recovery circuit 205 generates this control signal using a predetermined one of the outputs of the Hilbert filter along with sine and cosine wave forms supplied by sine/cosine calculator 206. The control signal is representative of any asynchronism between the transmit sample clock and the remote transmitter clock. The effect of the interpolator, therefore, is to alter the timing phase of the common sample clock source and provide the samples which would have been formed had the common sample clock been synchronized to the transmitter clock at the remote location. Receiver 207 recovers the received data from the I and Q outputs of the digital interpolator. In addition, receiver 207 also generates the receive bit clock, which synchronizes the received data, using the control signal on lead 208. This receiver is identical to its counterpart in FIG. 1 except that the timing recovery function has been extracted from the receiver in FIG. 2 and is provided by timing recovery circuit 205.

Figure 3:
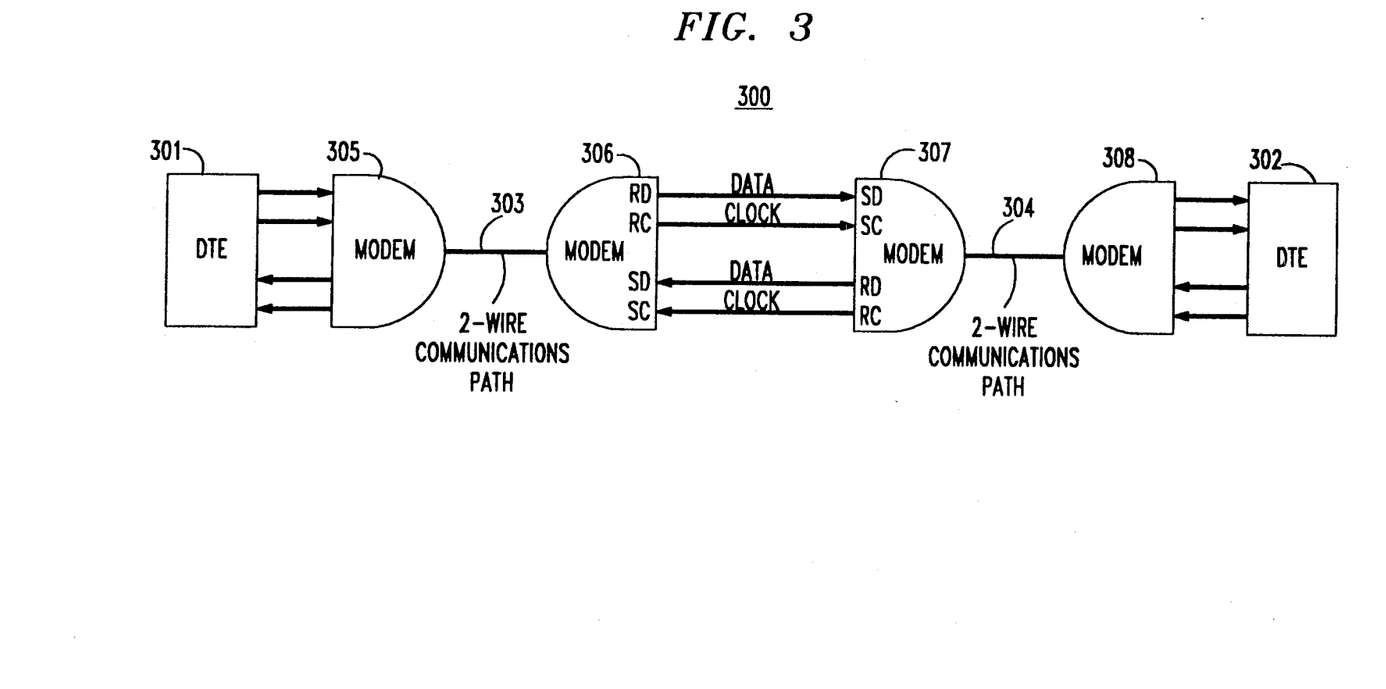
FIG. 3 is a block-schematic diagram of a tandem modem application which illustrates the timing synchronization problem which the present invention addresses.

With the use of a common sample clock, the transmitting and receive portions of a transceiver are not independent since the samples of the received signal are generated at the transmit sample clock rate. While this use of a common sample clock source works satisfactorily for many modem applications, there are situations where problems arise. One such application 300 is shown in FIG. 3 where data between digital terminal equipment (DTE) 301 and 302 are coupled through 2-wire communications paths 303 and 304 and serially connected modems 305, 306, 307 and 308. The pair of modems 306 and 307 are connected in tandem, i.e., their digital RS-232 interfaces are directly connected to one another. In such an interface, the designations RD, RC, SD and SC respectively designate a modem's receive data, receive bit clock, send data and send bit clock leads. For error-free synchronous operation, the transmit sample clock of modem 307 which is used to clock the signal coupled to path 304 must be synchronous with the receive bit clock in modem 306. Similarly, in the reverse direction, the transmit sample clock of modem 306, used to transmit signals toward path 303, must be synchronous with the receive bit clock in modem 307. Therefore, each transmitter in the tandem modem pair can be referred to as being clocked by an externally supplied transmit sample clock signal, i.e., a transmit sample clock signal controlled by the other modem's receive bit clock. If modems 306 and 307 incorporate the circuitry of FIG. 2, the A/D and D/A converters in codec 201 do not operate independently as both are clocked by the transmit sample clock. As a result, a feedback loop is formed wherein perturbations in the transmit sample clock of modem 306 affect the operation of the receive bit clock in this modem. In addition, the transmit sample clock of modem 307 is derived from the receive bit clock of modem 306 and, in turn, affects the receive bit clock of modem 307 from which the transmit sample clock of modem 306 is derived. This feedback loop causes instability which results in data errors and eventual loss of timing synchronization. A solution to this problem has heretofore not been found.

SUMMARY OF THE INVENTION

The present invention addresses a timing synchronization problem which arises in tandem modem operation when the A/D and D/A converters in the codec of a modem are strobed by a common sample clock. In accordance with the present invention, the receive portion of a modem includes an A/D converter and a digital interpolator. The interpolator alters the values of the digital samples provided by the A/D converter in response to first and second control signals. This alteration effectively alters the timing phase of the A/D converter. The first control signal is generated in response to an externally supplied clock and an internal modem clock and is representative of any perturbations in the externally supplied clock with respect to the internal modem clock. The second control signal is generated in response to digital signals generated from the incoming analog signal from a remote modem and is representative of any remaining asynchronism between the transmit sample clock of the remote modem and the modem's transmit sample clock as effectively altered by the operation of the digital interpolator in response to the first control signal alone. The effect of the second control signal removes the effect of any externally supplied clock perturbations with respect to the internal modem clock. This enables the receiver and transmit portions of the modem to operate independently of one another and thereby maintains timing synchronization.

DETAILED DESCRIPTION

Figure 4:
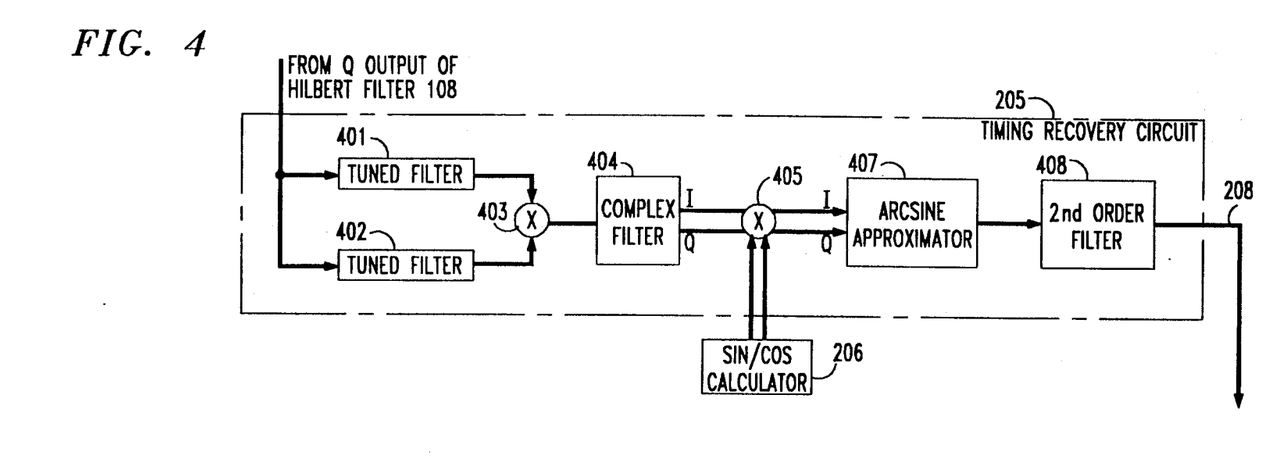
FIGS. 4 and 5, respectively, are block-schematic diagrams of the timing recovery circuit 205 of FIG. 2 and transmit sample clock generator 113 of FIGS. 1 and 2.

Refer now to FIG. 4 which shows the circuit elements within timing recovery circuit 205 of FIG. 2. As shown, a selected one of the Hilbert filter I or Q outputs is coupled to a pair of tuned filters 401 and 402 to extract the timing information from the signal received from the remote location. In the disclosed embodiment, it is assumed that the received signal is a QAM signal which incorporates the well-known V.32 data communications standard. In such a signal, the timing information of the transmitter at the remote location can be extracted from the narrow frequency bands of the received signal centered around 600 and 3000 Hz and filters 401 and 402 are respectively tuned to these frequencies. Multiplier 403 forms the product of the output tones of filters 401 and 402 which, in the disclosed application, is a set of tones at 3600 and 2400 Hz in the positive and negative frequency bands which repeat at 7200 Hz intervals. Complex filter 404 extracts the positive 2400 Hz tone, having I and Q components, from the set of tones formed by multiplier 403. In the disclosed embodiments, filter 404 is tuned to +2400 Hz. The I and Q components of the tone extracted by filter 404 form a timing vector representative of the phase angle difference between the transmitter clock at the remote location and that used to strobe the A/D converter. This vector is then demodulated by multiplier 405 using the I and Q components of the timing vector and sine and cosine waveforms provided by sine/cosine calculator 206. Calculator 206 provides the sine and cosine of an input angle designated as $\phi$. $\phi$ is the angular correction required to remove timing offset from the timing vector. Or, equivalently, $\phi$ is the phase adjustment required to align the clock signal used to strobe the A/D converter to that used to clock the transmitter at the remote location.

The demodulated timing vector represents the residual error or difference between the phase adjustment $\phi$ and the phase of the timing vector. This vector is then converted into an angle in radians by dividing the Q component of the demodulated timing vector by the absolute value of I+Q. Arcsine approximator 407 provides this function. The angular output of 407 is then coupled to a second order filter 408 that generates the angular correction $\phi$ on lead 208.

Figure 5:
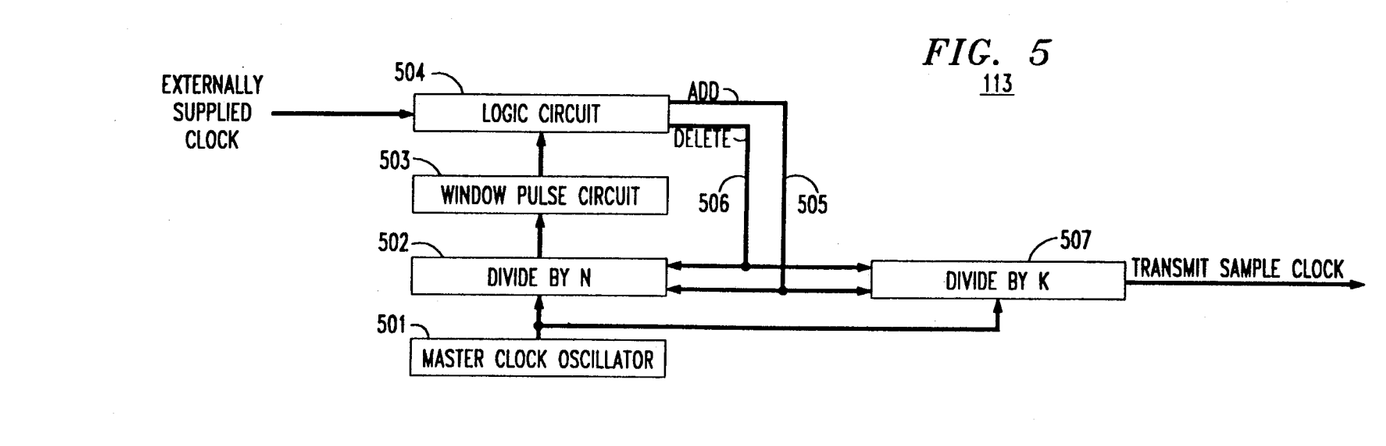

Transmit sample clock generator 113 provides the sample clock for A/D and D/A converters 201 and 202. As shown in FIG. 5, generator 113 includes a master clock oscillator 501 whose nominal frequency output is divided by an integer N using divider circuit 502. Divide-by-N circuit 502 generates a clock signal having the frequency of the externally supplied clock signal. Since the externally supplied clock signal is generally at the bit rate, the value of N is selected so that the frequency of the signal outputted by divide-by-N circuit 502 is equal to that of the transmit bit clock. Window pulse circuit 503 generates a narrow pulse around the rising edge of the output of divide-by-N circuit 502. This narrow pulse is then gated with the externally supplied clock signal by logic circuit 504 to provide a pair of control signals indicative of whether the external clock is early or late with respect to the output of divide-by-N circuit 502. More specifically, one control signal, designated as the "add" signal, is outputted on lead 505 and indicates that the externally supplied clock "leads" in phase the divided clock signal provided by divide-by-N circuit 502. In response to an add signal, divide-by-N circuit 502 effectively decrements N by one for a single cycle of the divide-by-N circuit. The other control signal, designated as the "delete" signal, is outputted on lead 506 and indicates that the externally supplied clock signal "lags" in phase the clock signal provided by divide-by-N circuit 502. In response to a delete signal, divide-by-N circuit 502 effectively increments N by one for a single cycle of the divide-by-N circuit. The effect of the add and delete control signals is to drive the divided clock outputted by circuit 502 into frequency and phase alignment with the externally supplied clock signal.

Divide-by-K circuit 507 is also coupled to the output of master clock oscillator 501. Circuit 507 divides the output of oscillator 501 by an integer K. The clock signal outputted by circuit 507 is used to strobe the A/D and D/A converters 201 and 202. In the disclosed embodiments of the present invention, this sample clock strobing the converters is at 7200 Hz and oscillator 501 has a nominal frequency of 40.5504 MHz and divide circuit 507 uses a value of K=5632. The add and delete signals on leads 505 and 506 are also used to respectively decrement and increment the value of K by one for a single cycle of the divide-by-K circuit. The effect of the add and delete signals on circuit 507 is to synchronize the transmit sample clock signal to the output of divide-by-N circuit 502 which, in turn, is phase locked to the externally supplied clock signal.

Figure 6:
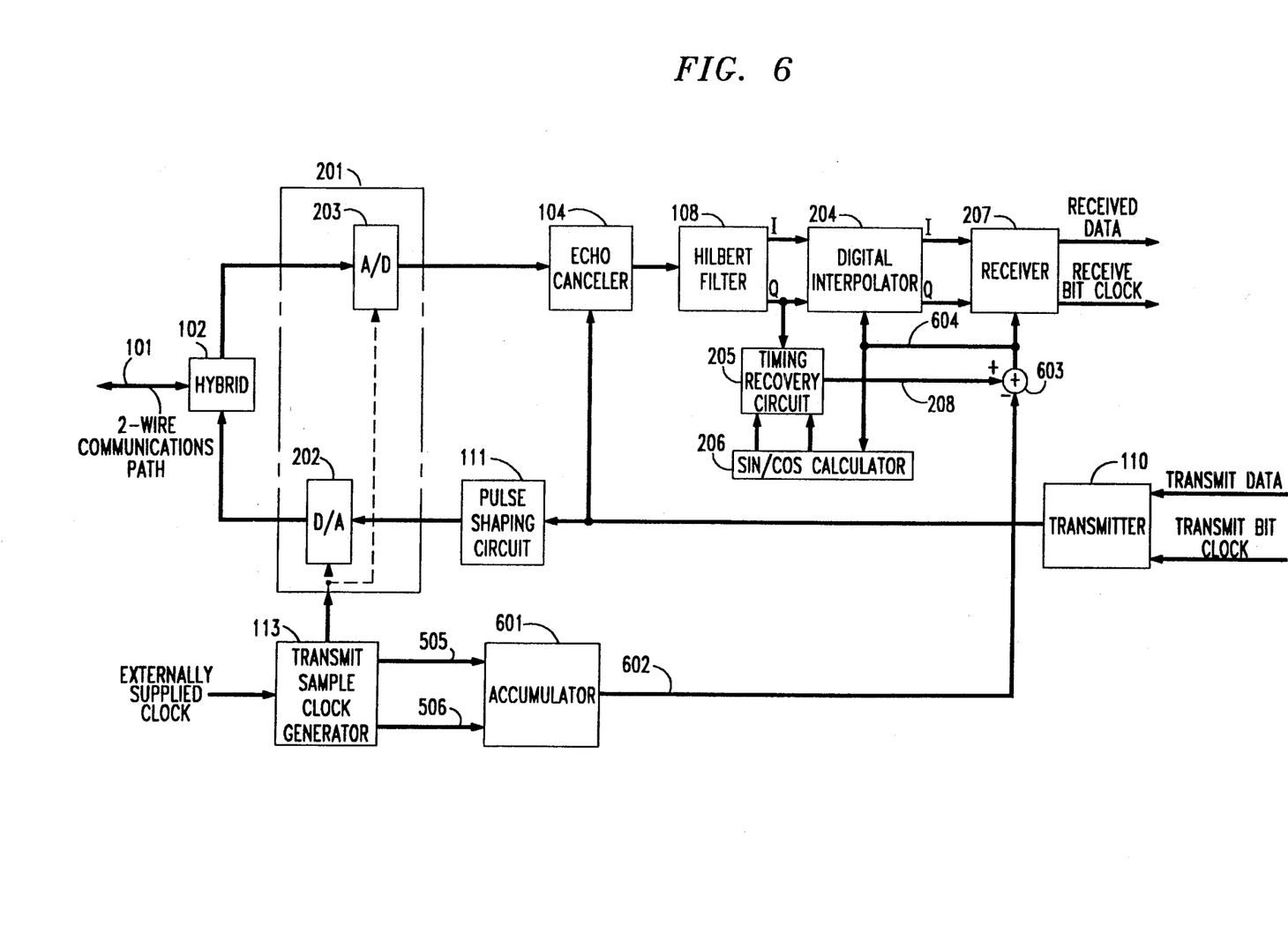
FIG. 6 is a block-schematic diagram of a first embodiment of the present invention.

Refer now to FIG. 6 which shows a first embodiment 600 of the present invention. Many of the circuit elements in FIG. 2 are incorporated in FIG. 6 and provide the same functionality in both of these drawing figures. Such "common" elements are designated by their FIG. 2 reference numerals.

In order to eliminate the timing synchronization problem described in tandem modem operation, the control signal provided to digital interpolator 204 in FIG. 6 is altered. Now, instead of being solely that signal generated by timing recovery circuit 205 on lead 208, this control signal is combined with another control signal generated by transmit sample clock generator 113 whose externally supplied clock signal is that clock signal coupled from the other tandem-connected modem. In other words, if we view the circuitry of FIG. 6 as being disposed within the receiver portion of modem 306 of FIG. 3, the externally supplied clock coupled to generator 113 is the clock signal coupled from the receive portion of modem 307. Alternatively, if the circuitry of FIG. 6 is disposed within the receiver portion of modem 307 of FIG. 3, the externally supplied clock signal coupled to generator 113 is the clock signal coupled from the receive portion of modem 306. More particularly, as shown in FIG. 6, the add and delete control signals generated on leads 505 and 506 and described in reference to FIG. 5 are coupled to accumulator 601. The accumulator accumulates the add and delete control signals so as to provide a cumulative indication of the relative phase between the externally supplied clock signal and the divided clock signal provided by circuit 502 in transmit sample clock generator 113. The accumulated signal appears on lead 602 and is supplied to adder 603. The adder algebraically combines the signal on lead 602 with the timing recovery circuit output on lead 208. This combination is then used to alter the timing phase of the common clock source and provide samples from digital interpolator 204 which would have been provided had A/D converter 203 been strobed by a clock signal which was phase aligned to that at the remote transmitter. The combination provided by adder 603 is also now used as an input to sin/cos calculator 206 to vary the waveforms provided therefrom.

Figure 7:
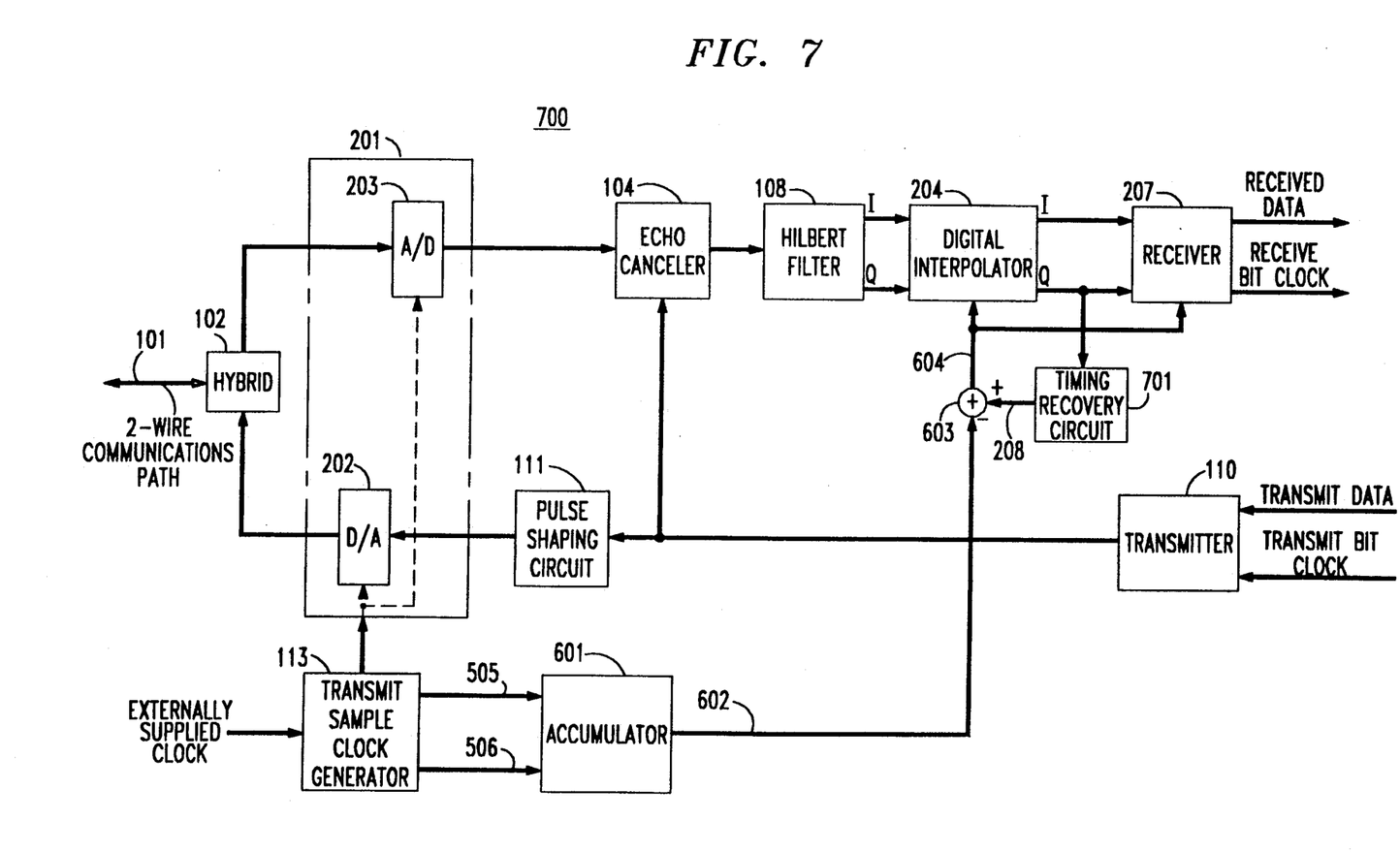
FIG. 7 is a block-schematic diagram of a second embodiment of the present invention.

A second embodiment of the present invention is shown in FIG. 7. The operation of this embodiment is similar to that described in reference to FIG. 6 except that the input to the timing recovery circuit is a selected one, e.g., the Q output of digital interpolator 204 and not the Hilbert filter. Adder 603 combines the output of timing recovery circuit 701 on lead 208 with the output of accumulator 601 on lead 602. This combination is then coupled to the interpolator to control the timing phase thereof. Note that in this embodiment, use of sin/cos calculator is eliminated as the function provided by this device is implicitly performed by the interpolator.

Figure 8:
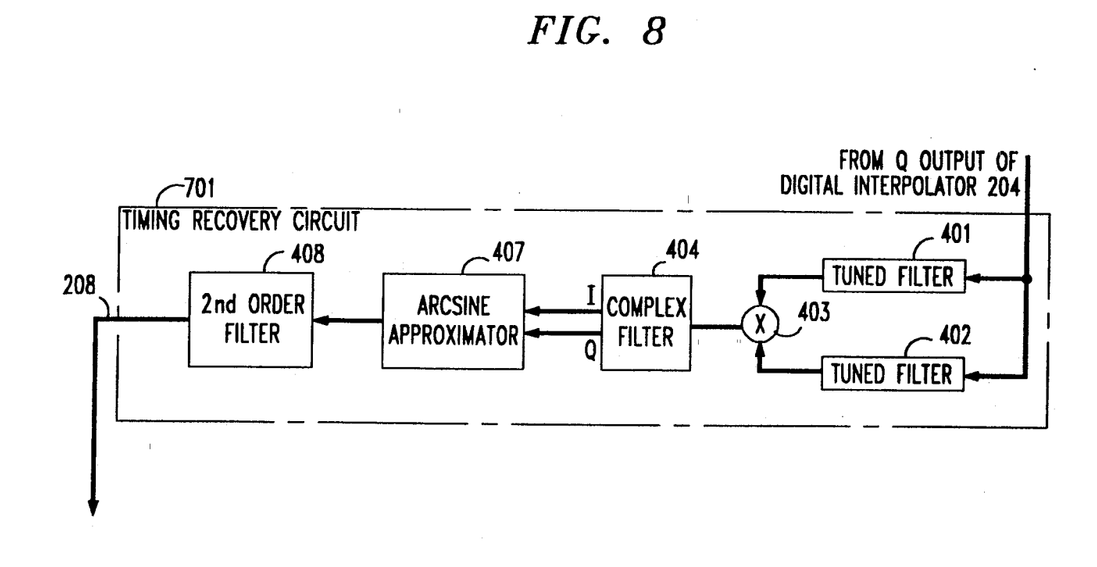
FIG. 8 is a block-schematic diagram of timing recovery circuit 701 of FIG. 7.

The circuitry within timing recovery circuit 701 is shown in FIG. 8 and is identical to that described in reference to FIG. 4 except that the use of multiplier 405 and sin/cos calculator 206 is eliminated.

It should, of course, be understood that while the present invention has been described in reference to the disclosed embodiments, other arrangements should be apparent to those of ordinary skill in the art. For example, while the embodiments of the present invention have been described in reference to discrete functional elements, the function of one or more of these elements can be provided by one or more appropriately programmed general-purpose processors, or special purpose integrated circuits, or digital signal processors, or an analog or hybrid counterpart of any of these devices.

We claim:

1. Apparatus for use in a communications system comprising
    means for forming digital samples of an incoming analog signal using a first clock signal;
    means for altering said digital samples in response to first and second control signals;
    means for generating said first control signal in response to a clock source and a second clock signal, said second clock signal being generated independently of said clock source; and
    means for generating said second control signal from digital signals generated from said incoming analog signal.

2. The apparatus of claim 1 wherein said altering means includes means for forming an algebraic combination of said first and second control signals and the digital samples are altered in response to this combination.

3. The apparatus of claim 1 wherein the digital signals generated from said incoming analog signal are the digital samples formed by said forming means.

4. The apparatus of claim 1 wherein the digital signals generated from said incoming analog signal are the altered digital samples provided by said altering means.

5. The apparatus of claim 1 wherein said first control signal generating means includes means for determining any frequency/phase difference between a signal derived from said clock source and said second clock signal and said first control signal is representative of this difference.

6. The apparatus of claim 1 wherein said second control signal generating means includes means for extracting timing information from said digital signal and said second control signal is representative of any difference between this extracted timing information and said first clock signal.

7. The apparatus of claim 6 wherein said extracting means includes a plurality of tuned filters.

8. The apparatus of claim 1 wherein said first clock signal is derived from said clock source.

9. A method for use in communications apparatus, said method comprising the steps of forming digital samples of an incoming analog signal using a first clock signal;

altering said digital samples in response to first and second control signals;

generating said first control signal in response to a clock source and a second clock signal, said second clock signal being generated independently of said clock source; and generating said second control signal from digital signals generated from said analog signal.

10. The apparatus of claim 1 wherein said first clock signal is phase aligned with said second clock signal.

11. The apparatus of claim 10 wherein said clock source is internal to said apparatus and said second clock signal is externally supplied to said apparatus.

* * * * *